United States Patent
Fletcher et al.

(10) Patent No.: US 9,459,619 B2
(45) Date of Patent: Oct. 4, 2016

(54) CONTINUOUS EQUIPMENT OPERATION IN AN AUTOMATED CONTROL ENVIRONMENT

(75) Inventors: Bryan Henry Fletcher, Portland, OR (US); James Andrew Graves, Portland, OR (US); Quay Isaac Gene Williams, Sandy, OR (US); David Peter Allen, Portland, OR (US)

(73) Assignee: MEGA FLUID SYSTEMS, INC., Tualatin, OR (US)

( * ) Notice: Subject to any disclaimer, the term of this patent is extended or adjusted under 35 U.S.C. 154(b) by 378 days.

(21) Appl. No.: 13/537,943

(22) Filed: Jun. 29, 2012

(65) Prior Publication Data

US 2013/0006393 A1 Jan. 3, 2013

Related U.S. Application Data (60) Provisional application No. 61/571,498, filed on Jun. 29, 2011.

(51) Int. Cl.
*G05B 11/01* (2006.01)
*G05B 23/02* (2006.01)
*G05B 9/02* (2006.01)

(52) U.S. Cl.
CPC ............. *G05B 23/0291* (2013.01); *G05B 9/02* (2013.01)

(58) Field of Classification Search
CPC ............................. G05B 23/0291; G05B 9/02
USPC .......................................... 700/12, 21, 27, 79
See application file for complete search history.

(56) References Cited

U.S. PATENT DOCUMENTS

| | | | | |
|---|---|---|---|---|
| 4,745,542 A * | 5/1988 | Baba et al. | ...................... | 700/79 |
| 4,965,714 A * | 10/1990 | Knecht | ........................... | 700/82 |
| 6,023,399 A * | 2/2000 | Kogure | ........................... | 361/23 |
| 6,381,506 B1 * | 4/2002 | Grappone | ....................... | 700/79 |
| 6,549,034 B1 * | 4/2003 | Pietrzyk et al. | ................. | 326/38 |
| 6,631,476 B1 * | 10/2003 | Vandesteeg et al. | .......... | 714/4.4 |
| 6,701,198 B1 * | 3/2004 | Vandesteeg et al. | .......... | 700/79 |
| 6,732,300 B1 * | 5/2004 | Freydel | ........................... | 714/36 |
| 6,832,121 B1 * | 12/2004 | Albrecht et al. | ................ | 700/79 |
| 6,832,343 B2 * | 12/2004 | Rupp et al. | .................. | 714/47.1 |
| 6,891,850 B1 * | 5/2005 | Vandesteeg et al. | .......... | 370/466 |
| 6,909,923 B2 * | 6/2005 | Vasko et al. | .................... | 700/79 |
| 7,269,465 B2 * | 9/2007 | Esch | .................... | G05B 19/042 370/216 |
| 7,472,106 B2 * | 12/2008 | Muneta et al. | | |

(Continued)

*Primary Examiner* — Charles Kasenge
(74) *Attorney, Agent, or Firm* — Matthew M. Hulihan, Esq.; Heslin Rothenberg Farley & Mesiti, PC (57) ABSTRACT

Continuous equipment operation is facilitated despite disablement of an automation controller for controlling the equipment. A safe state in which equipment is to be maintained upon disablement of the automation controller is determined. Safe state data is provided for configuring an I/O module, through which the automation controller controls the equipment, with the safe state data to facilitate maintaining the equipment in the safe state during disablement of the automation controller. In one embodiment, upon subsequent enablement of the automation controller, a current state of the I/O module is evaluated and an automatic control state into which the equipment is to be transitioned is determined. The equipment is then transitioned to the determined automatic control state.

21 Claims, 6 Drawing Sheets

(56) References Cited

U.S. PATENT DOCUMENTS

| | | | |
|---|---|---|---|
| 7,527,052 B2* | 5/2009 | Hickle | A61M 16/01 128/202.22 |
| 7,556,238 B2* | 7/2009 | Seberger | 251/69 |
| 7,787,966 B2* | 8/2010 | Rotzler | G05B 9/02 700/17 |
| 8,108,075 B2* | 1/2012 | Bohan, Jr. | G05B 9/02 700/21 |
| 8,149,554 B2* | 4/2012 | Pietrzyk et al. | 361/78 |
| 8,169,097 B2* | 5/2012 | Weitkamp | F03D 1/003 290/44 |
| 8,184,417 B2* | 5/2012 | Pietrzyk et al. | 361/88 |
| 8,321,040 B2* | 11/2012 | Sachs et al. | 700/81 |
| 8,335,573 B2* | 12/2012 | Buettner et al. | 700/21 |
| 8,560,094 B2* | 10/2013 | Ehrhart et al. | 700/79 |
| 8,595,827 B2* | 11/2013 | Zondler et al. | 726/21 |
| 2003/0208283 A1* | 11/2003 | Vasko et al. | 700/21 |
| 2004/0010732 A1* | 1/2004 | Oka | G06F 11/1456 714/13 |
| 2004/0210620 A1* | 10/2004 | Muneta et al. | 709/200 |
| 2005/0060605 A1* | 3/2005 | Gibart et al. | 714/11 |
| 2005/0060606 A1* | 3/2005 | Kalan et al. | 714/12 |
| 2005/0091410 A1* | 4/2005 | Gibart et al. | 709/248 |
| 2005/0109395 A1* | 5/2005 | Seberger | 137/8 |
| 2005/0149207 A1* | 7/2005 | Esch | G05B 19/042 700/21 |
| 2006/0253734 A1* | 11/2006 | Oka | G06F 11/1456 714/6.12 |
| 2007/0018127 A1* | 1/2007 | Seberger | 251/129.04 |
| 2007/0124115 A1* | 5/2007 | Buttner et al. | 702/186 |
| 2007/0168077 A1* | 7/2007 | Schuster | 700/170 |
| 2008/0221726 A1* | 9/2008 | Rotzler | G05B 19/042 700/213 |
| 2008/0225457 A1* | 9/2008 | Korrek | 361/100 |
| 2009/0171472 A1* | 7/2009 | Teranisi et al. | 700/3 |
| 2010/0125372 A1* | 5/2010 | Pietrzyk | G05B 19/0425 700/293 |
| 2011/0071672 A1* | 3/2011 | Sanders et al. | 700/245 |
| 2012/0005748 A1* | 1/2012 | Zondler et al. | 726/21 |
| 2012/0016495 A1* | 1/2012 | Zondler et al. | 700/12 |
| 2012/0022671 A1* | 1/2012 | Sachs et al. | 700/79 |

* cited by examiner

CONTINUOUS EQUIPMENT OPERATION IN AN AUTOMATED CONTROL ENVIRONMENT

CROSS REFERENCE TO RELATED APPLICATIONS

This application claims the benefit of U.S. Provisional Patent Application Ser. No. 61/571,498, filed Jun. 29, 2011, the contents of which are hereby incorporated herein by reference in its entirety.

BACKGROUND

Automation controllers, such as programmable logic controllers (PLC)s, are used in the automatic control of equipment of varying types. One particular application for automation controllers is the automatic control of industrial equipment (such as pumps, valves, compressors, relays, etc.). In many situations, continued operation of such components is critical. In an effort to reduce production losses due to failure of automation controllers, automation controller redundancy is sometimes employed. Automation controller redundancy provides, for instance, backup automation controller(s) programmed to take over automated control in the event of a failure of a primary automation controller. Though redundancy packages/solutions exist, they are often complicated and expensive. For instance, they typically require additional expenditures on hardware, and result in a complicated architecture in which many additional components are needed to provide the desired level of redundancy.

BRIEF SUMMARY

What is needed is the ability to maintain a desired state of equipment operation when an automation controller becomes disabled, as well as during controller repair/replacement, and through the process of transitioning the equipment back into automated control by the automation controller, all absent a need for redundant synchronized controllers. According to an aspect of the present invention, critical condition(s) of equipment operation can be maintained upon controller disablement (such as failure), and startup.

The shortcomings of the prior art are overcome and additional advantages are provided through the provision of a method that includes determining a safe state in which equipment is to be maintained upon disablement of an automation controller for controlling the equipment, and configuring an I/O module, through which the automation controller controls the equipment, with safe state data to facilitate maintaining, by the I/O module, the equipment in the safe state upon disablement of the automation controller, wherein the configuring facilitates continuous equipment operation upon disablement of the automation controller.

In one embodiment of the method provided herein, the provided method further includes, based on at least one of enablement or replacement of the automation controller, evaluating a current state of the I/O module, the current state reflecting a current state in which the equipment is being maintained, determining, based on the evaluating, an automatic control state into which the equipment is to be transitioned, and transitioning the equipment to the determined automatic control state.

In one embodiment of the method provided herein, the disablement comprises a failure of the automation controller.

In one embodiment of the method provided herein, the equipment is controlled by the automation controller via the I/O module.

In one embodiment of the method provided herein, the processor is a processor of the automation controller.

In one embodiment of the method provided herein, the safe state data is built by the processor based on the determined safe state, and the configuring includes providing the safe state data by the processor to the I/O module.

In one embodiment of the method provided herein, the I/O module is a network I/O module, and the processor is in communication with the network I/O module via one or more network connections.

In one embodiment of the method provided herein, the configuring occurs under normal operating conditions of the equipment, in which the automation controller is enabled.

In one embodiment of the method provided herein, the equipment includes industrial equipment, and the automation controller includes a programmable logic controller for controlling the industrial equipment.

In one embodiment of the method provided herein, the provided method further includes receiving, by the I/O module, the safe state data and storing the safe state data in a safe state data store, and based on disablement of the automation controller, transitioning, by the I/O module, operation of the equipment from a current state to the safe state.

Further provided herein is a system which includes a memory and a processor in communication with the memory. The processor is configured to execute program code stored in the memory to perform determining a safe state in which equipment is to be maintained upon disablement of an automation controller for controlling the equipment, and configuring an I/O module, through which the automation controller controls the equipment, with safe state data to facilitate maintaining, by the I/O module, the equipment in the safe state upon disablement of the automation controller, wherein the configuring facilitates continuous equipment operation upon disablement of the automation controller.

In one embodiment of the system provided herein, the processor is configured to execute program code stored in the memory to further perform, based on at least one of enablement or replacement of the automation controller, evaluating a current state of the I/O module, the current state reflecting a current state in which the equipment is being maintained, determining, based on the evaluating, an automatic control state into which the equipment is to be transitioned, and transitioning the equipment to the determined automatic control state.

In one embodiment of the system provided herein, the system includes the automation controller and the automation controller includes the memory and the processor.

In one embodiment of the system provided herein, the system further includes the I/O module, and the equipment is controlled by the automation controller via the I/O module.

In one embodiment of the system provided herein, the I/O module includes another processor, the another processor configured to execute program code of the I/O module to perform receiving the safe state data and storing the safe state data in a safe state data store, and, based on disablement of the automation controller, transitioning operation of the equipment from a current state to the safe state.

In one embodiment of the system provided herein, the equipment includes industrial equipment, and the automation controller includes a programmable logic controller for controlling the industrial equipment.

Yet further provided herein is a computer program product including a computer readable storage medium readable by a processor and storing instructions for execution by the processor to perform a method which includes determining a safe state in which equipment is to be maintained upon disablement of an automation controller for controlling the equipment, and configuring an I/O module, through which the automation controller controls the equipment, with safe state data to facilitate maintaining, by the I/O module, the equipment in the safe state upon disablement of the automation controller, wherein the configuring facilitates continuous equipment operation upon disablement of the automation controller.

In one embodiment of the computer program product provided herein, the method further includes, based on at least one of enablement or replacement of the automation controller, evaluating a current state of the I/O module, the current state reflecting a current state in which the equipment is being maintained, determining, based on the evaluating, an automatic control state into which the equipment is to be transitioned, and transitioning the equipment to the determined automatic control state.

In one embodiment of the computer program product provided herein, the method further includes building the safe state data by the processor based on the determined safe state, and the configuring includes providing the safe state data by the processor to the I/O module.

In one embodiment of the computer program product provided herein, the equipment includes industrial equipment, and the automation controller includes a programmable logic controller for controlling the industrial equipment.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and described herein advantageously facilitate continuous equipment operation despite disablement of an automation controller for controlling the equipment. As used herein, "controller", "automation controller", and "programmable controller" may be used interchangeably. In one embodiment, an automation controller comprises a memory and processor capable of executing program code from the memory to carry out one or more operations.

As noted, a typical redundancy solution involves expensive hardware and complicated architecture. Aspects of the present invention can employ functionality of existing PLCs and other automation controllers, along with processes described herein, smart I/O modules, and hardware, in order to support continued equipment operation when a PLC or other automation controller fails or otherwise becomes disabled. In one example, the controller becomes disabled as a result of a failure of the controller (e.g. hardware or software component failure or other fault), servicing of the controller, or replacement of the controller with another controller.

Figure 1A:
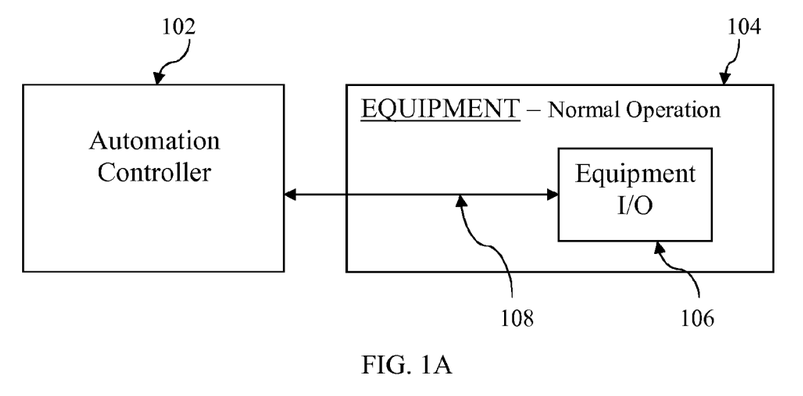
FIG. 1A depicts one example of normal operation in which an automation controller communicates through equipment I/O module(s) to control the state of the equipment.
Figure 1B:
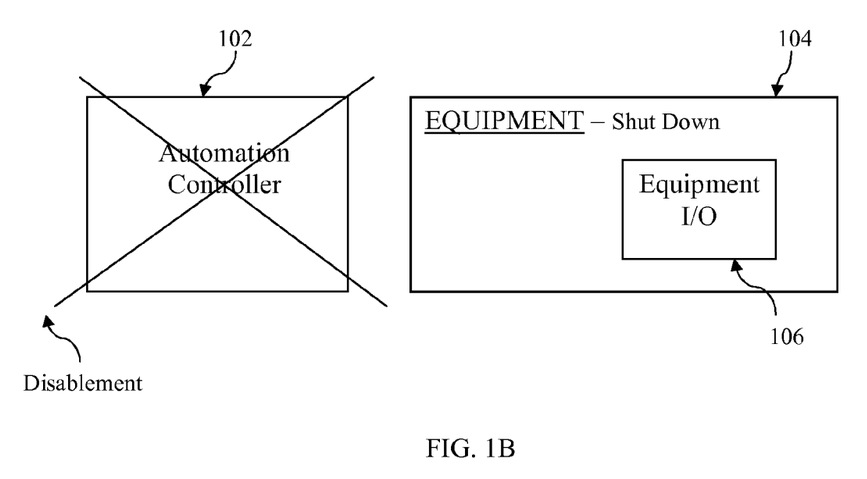
FIG. 1B depicts automation controller disablement, resulting in equipment shut down.

To illustrate such a scenario, attention is directed to FIGS. 1A and 1B. FIG. 1A depicts one example of normal operation in which an automation controller communicates through equipment I/O module(s) to control the operating state(s) of the equipment. In FIG. 1A, automation controller 102 controls equipment 104 (e.g. operation thereof) by way of equipment I/O module(s) 106.

In one example, equipment 104 comprises industrial equipment, which can include pump(s), valve(s), relay(s), etc, or any combination thereof. As further examples, equipment could include gas, chemical and/or slurry blending and/or delivery systems, filtration systems, metrologic and other measurement systems (including those for measuring pH, specific gravity, conductivity, large particle count, particle size and distribution, spiking chemical concentration, index of refraction, wavelength extinction and/or sound velocity), and/or SCADA systems, as examples.

I/O module 106 is in data communication with automation controller 102 by way of one or more communication link(s) 108. Automation controller 102 and equipment I/O module 106 may include communication circuitry to facilitate communication of data between controller 102 and I/O module 106, for instance data that provides commands to I/O module 106 for controlling equipment 104.

In FIG. 1A, equipment 104 is in 'normal operation', meaning operation thereof is being automatically controlled by automation controller 102 via I/O module 106, as is appreciated by those having ordinary skill in the art. In one particular example, automation controller 102 includes a CompactLogix controller offered by Allen-Bradley (a brand of Rockwell Automation, Milwaukee, Wis.) and I/O module 106 includes a DeviceNet-based Flex I/O (networked I/O module) also offered by Allen-Bradley, in which the controller and I/O module are in network communication via one or more network connections.

FIG. 1B depicts automation controller disablement, resulting in equipment shut down. As depicted in FIG. 1B, upon disablement of automation controller 102, communication between controller 102 and I/O module 106 is lost and the critical equipment processes shut down. As a result, equipment 104 enters a shut-down state.

Disablement includes, in one example, failure or fault of one or more components of automation controller 102. The failure or fault could, for instance, be in hardware or software, or a combination or both. In one example, a processor, such as a CPU, of controller 102 fails and replacement thereof is required. Additionally or alternatively, a software fault results which causes disablement until it can be reset. In other examples, controller 102 may become disabled for routine or planned maintenance, such as offline programming, or for replacement of the controller with another controller, as examples.

According to an aspect of the present invention, software actively programs an I/O module with "safe state" data, such as when the controller is operating under normal conditions. In the event of a failure or other disablement of the controller, the I/O module will default to the "safe state" and supply the necessary signals to the equipment to maintain the equipment in the safe state, which may include, in one example, a controlled shut-down or standby state. Upon re-enablement (such as restart, fault-clear, or replacement of a component of the controller) or upon replacement of the automation controller itself, software (for instance of the re-enabled or another controller) determines current runtime condition(s) of the equipment and configures the I/O module to support a 'bump-less' transition back to automatic control by the re-enabled (or other) controller.

Figure 2:
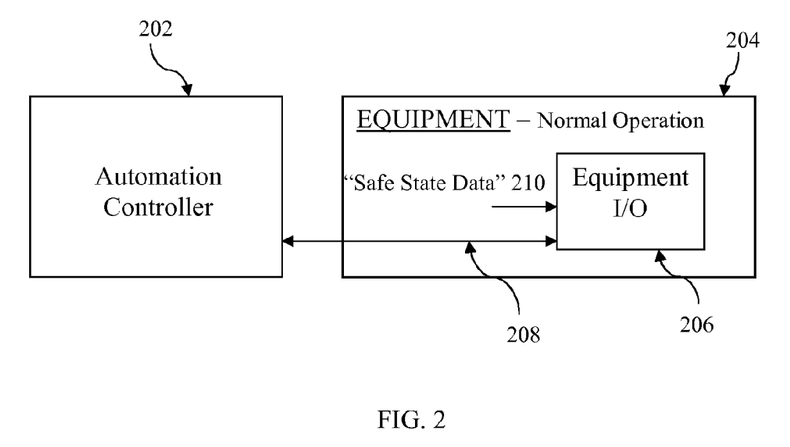
FIG. 2 depicts an example of configuring an equipment I/O module with safe state data to facilitate maintaining a safe state of equipment operation, in accordance with one or more aspects of the present invention.

FIG. 2 depicts an example of configuring an equipment I/O module with safe state data to facilitate maintaining a safe state of equipment operation, in accordance with one or more aspects of the present invention. In FIG. 2, automation controller 202 controls equipment 204 by way of I/O module(s) 206. As before, controller 202 and I/O module 206 are in data communication with each other via communication link(s) 208.

In accordance with an aspect of the present invention, controller 202 configures the I/O module with "safe state data" 210. As an example, program code executing on controller 202 actively programs I/O module 206 with "safe state" data. This programming occurs, in one example, during normal operating conditions of the controller (i.e. during normal automated control of equipment 204 by controller 202). Thus, the safe state data may be pre-defined and provided to I/O module 206 at some time prior to a disablement of controller 202. In one example, provision of the safe state data utilizes the controller's existing capability, if present, to 'explicit' or 'direct' message the I/O module to actively configure/provide the preferred safe state data in the I/O module. In addition, if I/O module is not already configured to fail-over to the safe state data (i.e. in the event of controller disablement), then configuration of the I/O module can include configuring it to fail to pre-defined data (aka "safe state data").

The safe state data provides the information necessary for the I/O module 206 to maintain the equipment in the desired safe state. In one example, the safe state data includes program code or other data for providing and/or dictating the signaling provided by the I/O module 206 to equipment 204 for maintaining safe state operation of equipment 204. In one embodiment, I/O module 206 includes a storage medium (or portion thereof), such as a memory, for storing the safe state data with which the I/O module 206 is configured. In one embodiment, I/O module includes a processor (such as a microprocessor, CPU, etc.) for processing program code to control operation of the I/O module (and thus equipment 204). In other embodiments, I/O module may be embodied wholly or partly in software, hardware, or a combination of software and hardware. In addition, I/O module may or may not be a self-contained module, and thus may, for instance, include component(s) that are embodied in separate or distinct physical components (such as partly within the automation controller, partly within the equipment, or both).

Additionally or alternatively, in one embodiment, safe state data is provided periodically or aperiodically to remove, replace, add-to, or update safe state data with which the I/O module is/was configured. In one example, a determination is continually or intermittently made as to a proper safe state in which equipment 204 is to be maintained upon controller disablement, and updated or alternative safe state data is provided to I/O module 206 to be maintained until it is either removed, replaced, or update at a later time.

Figure 3:
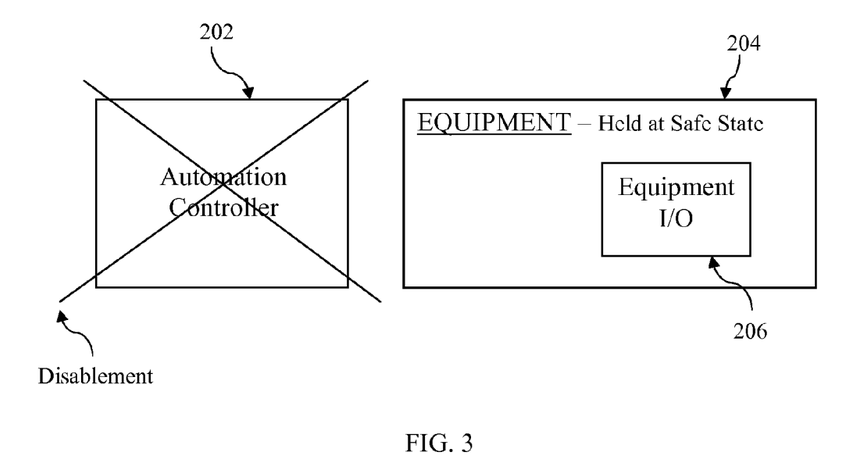
FIG. 3 depicts an example in which the I/O module holds the equipment in the pre-defined safe state during disablement of the automation controller, in accordance with one or more aspects of the present invention.

FIG. 3 depicts an example in which the I/O module holds the equipment in the pre-defined safe state during disablement of the automation controller, in accordance with one or more aspects of the present invention. In FIG. 3, automation controller 202 becomes disabled, for instance due to a failure or due to an operator bringing down the controller for service. When controller 202 fails or is switched out of "running" mode, I/O module 206 defaults to the "safe state" and continues to supply critical process(es). That is, I/O module 206 continues to support the critical process(es) as defined or indicated by the safe data. Thus, the critical processes, which were identified and serve as one basis on which the safe state data was built, continue to operate.

Figure 4:
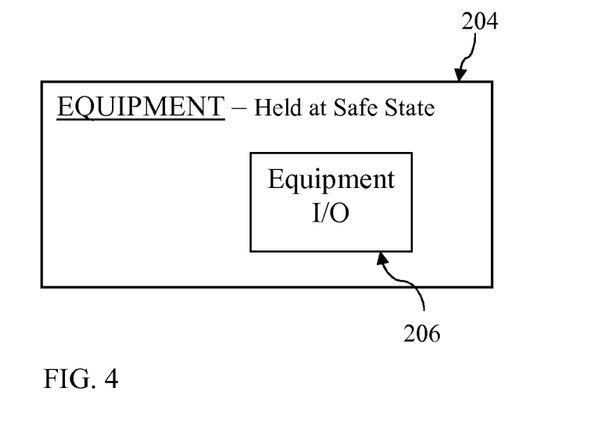
FIG. 4 depicts an example in which the I/O module holds the equipment in the pre-defined safe state during repair or replacement of the automation controller, in accordance with one or more aspects of the present invention.

An operator or technician of the automated control environment can service the controller (e.g. replace a processor or other hardware component thereof, clear faults, or provide offline programming), or replace the controller itself. During this repair or replacement, the I/O module holds the equipment in the pre-defined safe state, even when no controller is present (FIG. 4). The controller can be either be removed from active engagement in the environment, reset, or replaced, as examples, while the system is running and held in the safe state.

At some later time, a controller is enabled for resuming automatic control of equipment 204. In one example, the enabled controller is the same controller that initially became disabled. In another example, the controller is a replacement controller to replace the previous controller. In any case, upon enablement of the controller, the current runtime conditions are determined, for instance by software of the controller, and then I/O module is configured to support a bump-less transition back to automatic control of the equipment.

Figure 5:
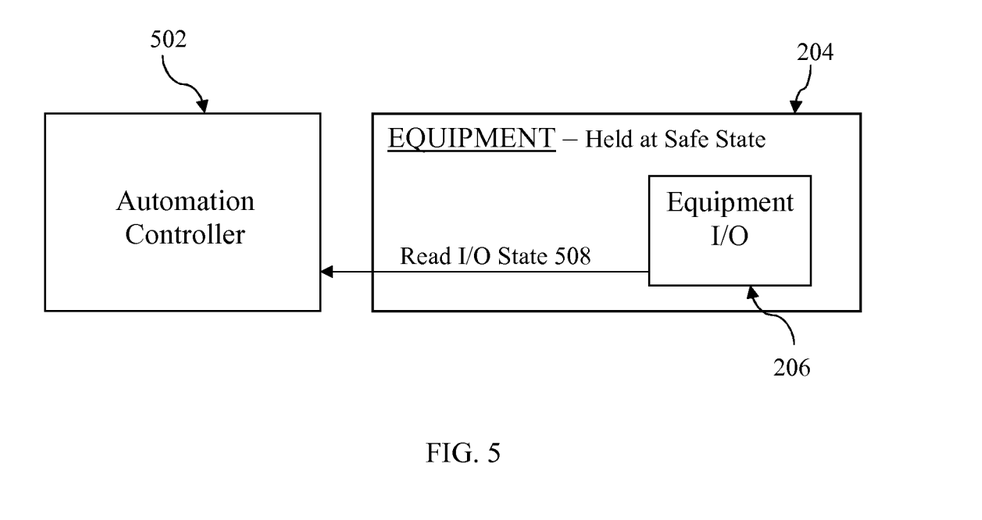
FIG. 5 depicts an example of reading a current I/O module state upon enablement or replacement of the automation controller, in accordance with one or more aspects of the present invention.

FIG. 5 depicts an example of reading a current I/O module state upon enablement or replacement of the automation controller, in accordance with one or more aspects of the present invention. Initially, controller 502 (i.e. either the replacement for the previous controller, or the previous controller which was repaired/serviced) is prevented from writing to I/O module 204. For instance, in one example, software of controller 502 disables all network control by the controller. At this point, controller 502 reads the current state (508) of I/O module 206 which reflects a current state in which equipment 204 is being maintained. In one example, software of controller 502 determines and evaluates the current state of equipment 204, for instance by way of I/O module 206. In one example, this is facilitated by reading the input(s) or direct messaging to the remote I/O module 206. The controller can then transition the logic to support the current running state for a smooth transition from safe state to automatic control.

Figure 6:
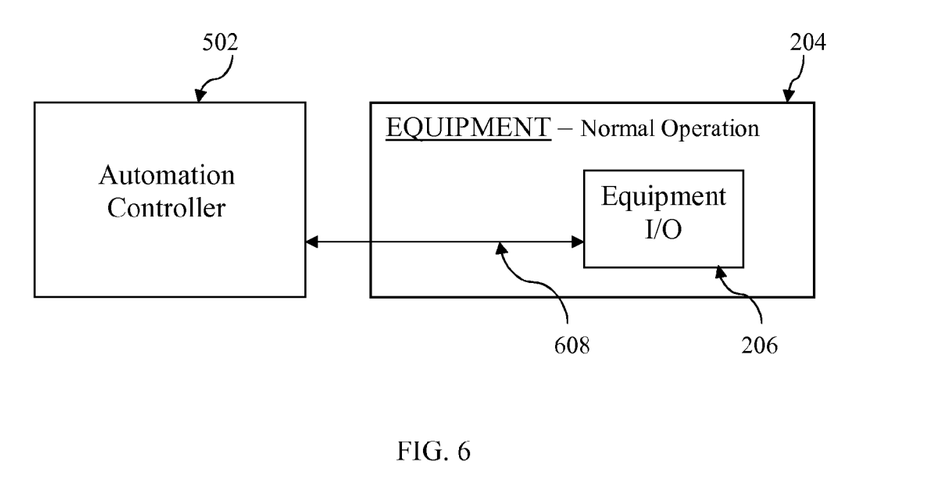
FIG. 6 depicts an example in which equipment is transitioned back to a normal operating state, in accordance with one or more aspects of the present invention.

FIG. 6 depicts an example in which equipment is transitioned back to a normal operating state (i.e. automatic control), in accordance with one or more aspects of the present invention. In one example, program code of controller 502 enables I/O module 206 outputs, which enables the transition of equipment 204 back into (normal) automatic control state in which automatic control of equipment 204 by controller 502 is provided, as is data communication 608 between controller 502 and I/O module 206.

Figure 7:
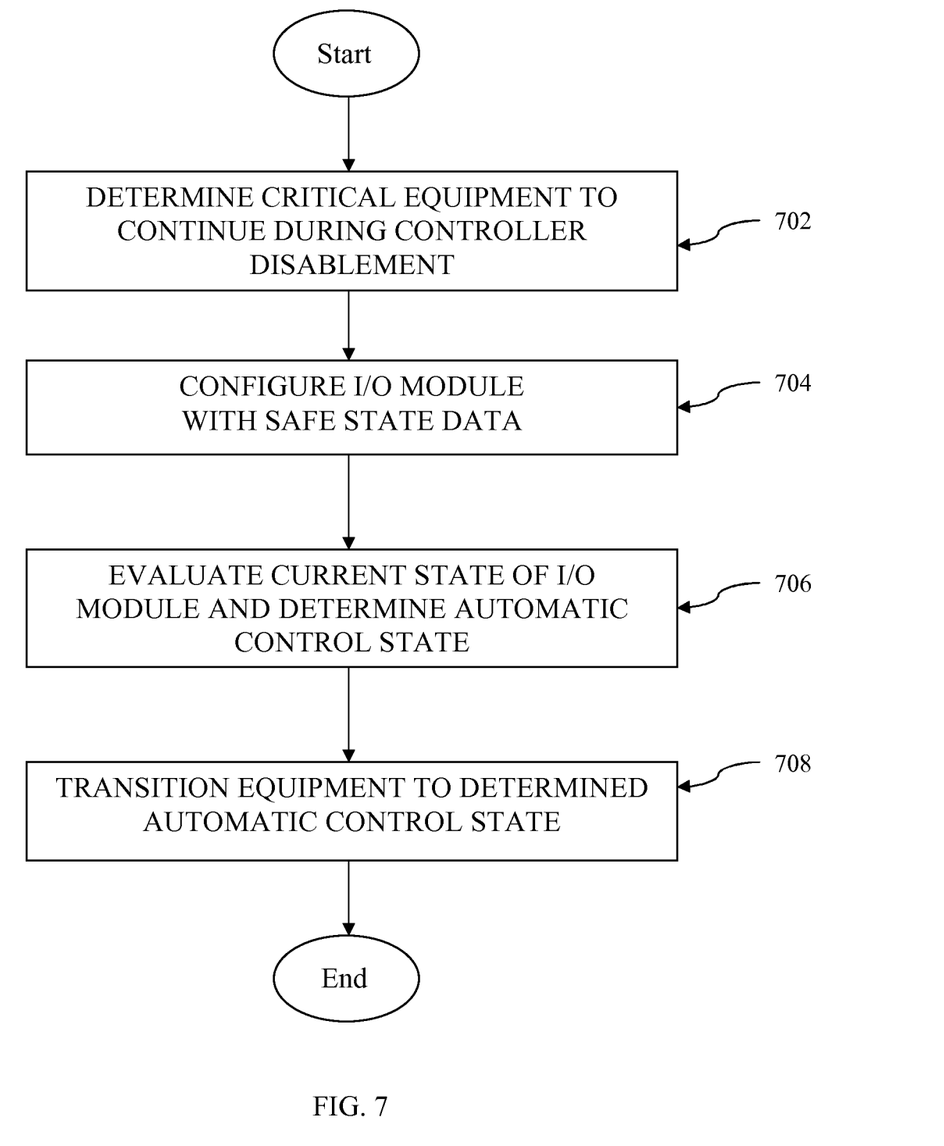
FIG. 7 depicts one example of a process to facilitate continuous equipment operation, in accordance with one or more aspects of the present invention.

As seen from the above, continuous equipment operation is facilitated. One example of a process to facilitate continuous equipment operation in accordance with one or more aspects of the present invention is depicted in FIG. 7. In one example, the process is performed, at least partially, by the automation controller. The process begins by determining critical equipment process(es) to continue during a controller disablement (702). This determination is a determination of the safe state in which the equipment is to be maintained upon disablement of the controller. In one example, this is determined using the controller and/or I/O module and may be based, at least in part, on other data maintained at the controller or elsewhere that indicates the critical process(es) that are to be maintained. In one particular example, this other data may be provided by, for instance, an operator of the automation controller or automated control environment.

From the determined safe state, safe state data can be built, for instance by the controller or another component, such as a separate data processing system in communication with the controller. The safe state data is built such that the I/O module can use (e.g. read and/or execute) the safe state data to maintain the equipment in the safe state should the controller become disabled.

Then, the I/O module is configured with the safe state data (704). In one example, program code in the controller actively replaces/updates the I/O's pre-defined safe data to support the correct failure mode. Additionally, it can be determined whether the I/O module is configured to support defaulting operation to the pre-defined safe state data should the controller become disabled. If not, the I/O module can be configured to do so.

At some time thereafter, the controller becomes disabled. Based on this disablement, the I/O module may transition operation of the equipment from a current state to the safe state by was of the safe state data with which the I/O module is configured. After the controller has become enabled/restored (or another controller has been installed and enabled), the process of FIG. 7 continues by evaluating the current state of the I/O module, which reflects a current state in which the equipment is being maintained, and determines, based on this evaluation, an automatic control state into which the equipment is to be transitioned (706). In one example, the determined current state is the safe state in which the equipment is maintained during disablement of controller, and the determined automatic control state is the automatic control state in which the equipment was being maintained prior to the controller becoming disabled. In another example, the determined automatic control state is an updated or otherwise modified (as compared to the prior automatic control state) control state, modified based on a change in conditions (e.g. time) between the time of controller disablement and the time of enabling the serviced or replacement controller.

Finally, the equipment is transitioned to the determined automatic control state (708). For instance, program code of the enabled controller enables I/O module output(s), and the equipment is thereafter automatically controlled by the enabled automation controller.

In an example in which an existing PLC, networked I/O module, and latching relay(s) are employed, the safe state data supports controlled shutdown of the equipment and, upon enablement of the controller after its disablement, the current status (shutdown) is determined and controlled startup of the equipment is effected.

In an alternate example, in which an existing PLC and latching relay(s) are employed but either (i) the PLC is unable to direct message the I/O module or (ii) the I/O module does not support direct messaging by the PLC, then the I/O controller may be configured with the safe state data by latched relay(s) supporting a controlled shutdown of the equipment, and, upon enablement of the controller after its disablement, the current status (shutdown) is determined and controlled startup of the equipment is effected.

It will be immediately appreciated by those having ordinary skill in the art that aspects of the present invention may be used with various types of PLCs or other automation controllers, as well as various types of "smart" or programmable I/O modules and other "smart I/O".

By way of further example to describe one or more aspects of the present invention, below is one specific example in which a controller disablement/enablement simulation was performed utilizing an Allen Bradley Compact Logicx PLC and DeviceNet Flex I/O to control a tool (equipment) that included pumps and valves. During the automatic runtime conditions, the PLC direct messages the safe state data configuration to the I/O module. The tool was operating at a constant pressure and flowrate, providing fluid to a tubing loop. A PLC failure was simulated by a programmatic array overrun. The PLC "faulted" and the networked I/O module maintained pressure and flow. The PLC fault was cleared via development software, and then set to RUN. Software of the PLC then halted the scanning of the network I/O module (disabling its outputs, and allowing the safe state data to be maintained). The software then: (1) direct messaged the networked I/O module and evaluated the current input data, (2) set the correct automatic mode initialization parameters, (3) enabled the scanning of network I/O module, and (4) enabled I/O module outputs. Thereafter, automatic control was restored.

Aspects of the present invention advantageously facilitate continuous equipment operation in an automated control environment. Equipment critical operation is maintained through the entire controller downtime, thereby providing critical operation during controller failure absent use of expensive redundant controller(s) or additional hardware. This is especially important in applications where discontinuity in equipment operation can have significant negative impact on security or asset loss/damage, such as with particular types of equipment, including, but not limited to, generators, compressors, engines, factory equipment, construction equipment, mission-critical industrial equipment, and equipment offering critical infrastructure protection. For instance, aspects of the present invention, when used in gas or chemical delivery systems for semiconductor manufacturing, enables the gas or chemical delivery systems to continue to operate in a safe mode, such as supplying such gasses or chemicals to the semiconductor manufacturing systems without discontinuity in equipment operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Additionally, program code may execute entirely on one system, partly on the one system, as a stand-alone software package, partly on the one system and partly on a remote system, or entirely on the remote system. In the latter scenario, the remote system may be connected to the one system through any type of network, including a local area network (LAN) or a wide area network (WAN), or the connection may be made to an external computer (for example, through the Internet using an Internet Service Provider).

Figure 8:
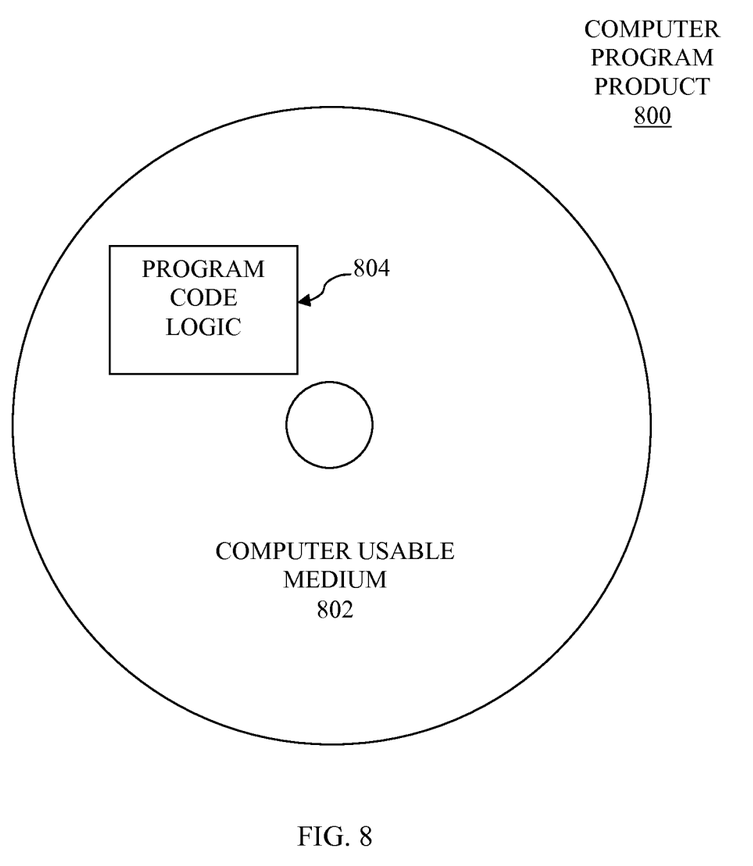
FIG. 8 depicts one embodiment of a computer program product to incorporate one or more aspects of the present invention.

Referring now to FIG. 8, in one example, a computer program product 800 includes, for instance, one or more computer readable media 802 to store computer readable program code means or logic 804 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system, such as a controller, suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
   determining a safe state in which equipment is to be maintained upon disablement of an automation controller, the automation controller configured to control the equipment by providing commands to an I/O module to control the equipment, the automation controller being a separate component from the I/O module; and
   prior to a disablement of the automation controller in which control of the equipment by the automation controller is lost, performing:
      configuring the I/O module with safe state data to facilitate maintaining, by the I/O module, the equipment in the safe state upon disablement of the automation controller in which control of the equipment by the automation controller is lost; and
      configuring the I/O module to provide one or more signals, based on the safe state data, to the equipment upon disablement of the automation controller and loss of control of the equipment by the automation controller, wherein the configuring the I/O module with the safe state data and the configuring the I/O module to provide the one or more signals facilitates continuous equipment operation upon disablement of the automation controller despite the loss of control of the equipment by the automation controller during the disablement of the automation controller.

2. The method of claim 1, further comprising:
   based on at least one of enablement or replacement of the automation controller, evaluating a current state of the I/O module, the current state reflecting a current state in which the equipment is being maintained;
   determining, based on the evaluating, an automatic control state into which the equipment is to be transitioned; and
   transitioning the equipment to the determined automatic control state.

3. The method of claim 1, wherein the disablement comprises a failure of the automation controller, and the loss of control of the equipment by the automation controller comprises a loss of communication between the I/O module and the automation controller.

4. The method of claim 1, wherein the equipment comprises the I/O module as a component thereof, and wherein the automation controller is a separate component from the equipment.

5. The method of claim 1, wherein the configuring the I/O module with safe state data is performed at least in part by a processor of the automation controller.

6. The method of claim 1, wherein the safe state data is built by a processor based on the determined safe state, and wherein the configuring the I/O module with the safe state data comprises providing the safe state data by the processor to the I/O module.

7. The method of claim 5, wherein the I/O module is a network I/O module, and wherein the processor is in communication with the network I/O module via one or more network connections.

8. The method of claim 1, wherein the configuring the I/O module with the safe state data occurs under normal operating conditions of the equipment, in which the automation controller is enabled.

9. The method of claim 1, wherein the equipment comprises industrial equipment, and wherein the automation controller comprises a programmable logic controller for controlling the industrial equipment.

10. The method of claim 1, further comprising:
    receiving, by the I/O module, the safe state data and storing the safe state data in a safe state data store; and
    based on disablement of the automation controller, transitioning, by the I/O module, operation of the equipment from a current state to the safe state.

11. A system comprising:
    a memory; and
    a processor in communication with the memory, wherein the system is configured to perform:
       determining a safe state in which equipment is to be maintained upon disablement of an automation controller, the automation controller configured to control the equipment by providing commands to an I/O module to control the equipment, the automation controller being a separate component from the I/O module; and
       prior to a disablement of the automation controller in which control of the equipment by the automation controller is lost, performing:
          configuring the I/O module with safe state data to facilitate maintaining, by the I/O module, the equipment in the safe state upon disablement of the automation controller in which control of the equipment by the automation controller is lost; and
          configuring the I/O module to provide one or more signals, based on the safe state data, to the equipment upon disablement of the automation controller and loss of control of the equipment by the automation controller, wherein the configuring the I/O module with the safe state data and the configuring the I/O module to provide the one or more signals facilitates continuous equipment operation upon disablement of the automation controller despite the loss of control of the equipment by the automation controller during the disablement of the automation controller.

12. The system of claim 11, wherein the processor is configured to execute program code stored in the memory to further perform:
based on at least one of enablement or replacement of the automation controller, evaluating a current state of the I/O module, the current state reflecting a current state in which the equipment is being maintained;
determining, based on the evaluating, an automatic control state into which the equipment is to be transitioned; and
transitioning the equipment to the determined automatic control state.

13. The system of claim 11, wherein the system comprises the automation controller and wherein the automation controller comprises the memory and the processor.

14. The system of claim 13, wherein the system further comprises the I/O module.

15. The system of claim 14, wherein the I/O module comprises another processor, the another processor configured to execute program code of the I/O module to perform:
receiving the safe state data and storing the safe state data in a safe state data store; and
based on disablement of the automation controller, providing the one or more signals to the equipment, wherein the one or more signals transition operation of the equipment from a current state to the safe state.

16. The system of claim 13, wherein the equipment comprises industrial equipment, and wherein the automation controller comprises a programmable logic controller for controlling the industrial equipment.

17. A computer program product comprising:
a non-transitory computer readable storage medium readable by a processor and storing instructions for execution by the processor to perform a method comprising:
determining a safe state in which equipment is to be maintained upon disablement of an automation controller, the automation controller configured to control the equipment by providing commands to an I/O module to control the equipment, the automation controller being a separate component from the I/O module; and
prior to a disablement of the automation controller in which control of the equipment by the automation controller is lost, performing:
configuring the I/O module with safe state data to facilitate maintaining, by the I/O module, the equipment in the safe state upon disablement of the automation controller in which control of the equipment by the automation controller is lost; and
configuring the I/O module to provide one or more signals, based on the safe state data, to the equipment upon disablement of the automation controller and loss of control of the equipment by the automation controller, wherein the configuring the I/O module with the safe state data and the configuring the I/O module to provide the one or more signals facilitates continuous equipment operation upon disablement of the automation controller despite the loss of control of the equipment by the automation controller during the disablement of the automation controller.

18. The computer program product of claim 17, wherein the method further comprises:
based on at least one of enablement or replacement of the automation controller, evaluating a current state of the I/O module, the current state reflecting a current state in which the equipment is being maintained;
determining, based on the evaluating, an automatic control state into which the equipment is to be transitioned; and
transitioning the equipment to the determined automatic control state.

19. The computer program product of claim 17, wherein the method further comprises building the safe state data by the processor based on the determined safe state, and wherein the configuring the I/O module with the safe state data comprises providing the safe state data by the processor to the I/O module.

20. The computer program product of claim 17, wherein the equipment comprises industrial equipment, and wherein the automation controller comprises a programmable logic controller for controlling the industrial equipment.

21. A method comprising:
receiving, by an I/O module, safe state data from an automation controller during a normal operating condition in which the automation controller controls equipment by providing commands to the I/O module to control the equipment, the I/O module and the automation controller being separate components, the I/O module configured with safe state data to facilitate maintaining, by the I/O module, the equipment in a safe state upon disablement of the automation controller in which control of the equipment by the automation controller is lost, and the I/O module configured to provide one or more signals, based on the safe state data, to the equipment upon disablement of the automation controller and loss of control of the equipment by the automation controller;
based on a disablement of the automation controller and loss of control of the equipment by the automation controller, recognizing, by the I/O module, the disablement of the automation controller, wherein the recognizing comprises the I/O module recognizing that control of the equipment by the automation controller is lost; and
based on the I/O module recognizing the disablement of the automation controller, automatically controlling, by the I/O module, the equipment based on the safe state data, in which the I/O module controls operation of the equipment during at least a portion of the disablement of the automation controller, despite the control of the equipment by the automation controller being lost.

* * * * *